United States Patent
Nurminen et al.

(10) Patent No.: US 12,156,099 B2
(45) Date of Patent: Nov. 26, 2024

(54) METHODS AND SYSTEMS FOR IMPROVED DATA COLLECTION IN A POSITIONING SOLUTION THAT LEVERAGES CLOSED-LOOP LEARNING (CLL)

(71) Applicant: HERE GLOBAL B.V., Eindhoven (NL)

(72) Inventors: Henri Jaakko Julius Nurminen, Tampere (FI); Veijo Ilomäki, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 352 days.

(21) Appl. No.: 17/885,413

(22) Filed: Aug. 10, 2022

(65) Prior Publication Data
US 2024/0056770 A1    Feb. 15, 2024

(51) Int. Cl.
*H04W 4/029*    (2018.01)
*G01S 5/02*    (2010.01)
*G06F 9/451*    (2018.01)
*H04W 4/33*    (2018.01)

(52) U.S. Cl.
CPC ......... *H04W 4/029* (2018.02); *G01S 5/02521* (2020.05); *G06F 9/451* (2018.02); *H04W 4/33* (2018.02)

(58) Field of Classification Search
CPC ......... H04W 4/029; H04W 4/33; G06F 9/451; G01S 5/02521
See application file for complete search history.

(56) References Cited

U.S. PATENT DOCUMENTS

| | | | |
|---|---|---|---|
| 10,003,928 B2 | 6/2018 | Nagpal et al. | |
| 10,178,559 B2 | 1/2019 | Ivanov et al. | |
| 10,304,237 B2 | 5/2019 | Sequeira et al. | |
| 10,794,986 B2 | 10/2020 | Bhatti et al. | |
| 11,212,649 B2 * | 12/2021 | Ivanov | G01S 5/0027 |
| 2021/0274310 A1 | 9/2021 | Chen et al. | |
| 2021/0341563 A1 * | 11/2021 | Jadav | H04W 4/023 |
| 2022/0196784 A1 * | 6/2022 | Wirola | G01S 5/02521 |

(Continued)

FOREIGN PATENT DOCUMENTS

| | | | | |
|---|---|---|---|---|
| CN | 114916059 A | * | 8/2022 | G01S 11/06 |
| CN | 115278544 A | * | 11/2022 | |

(Continued)

*Primary Examiner* — Adam D Houston
(74) *Attorney, Agent, or Firm* — Jeffrey R. Moisan; HERE GLOBAL B.V.

(57) ABSTRACT

Disclosed is an approach for improved radio and/or altitude data collection in the context of a positioning system. In particular, processor(s) could execute a first phase of the collection process, which may involve collection of data only in seed area(s) associated with generation of an initial map as well as setting forth guidance, via a user interface of a mobile device, to collect data only in the seed area(s). And when the processor(s) detect a trigger to end the first phase, the processor(s) could responsively execute a second phase of the process, which may involve collection of data in secondary area(s) associated with generation of an updated map as well as setting forth guidance, via the user interface, (i) to collect data in the secondary area(s) and (ii) to visit seed area(s) and/or other area(s) that are deemed to be ready.

20 Claims, 10 Drawing Sheets

(56) References Cited

U.S. PATENT DOCUMENTS

| | | | |
|---|---|---|---|
| 2022/0386072 A1* | 12/2022 | Nurminen | H04W 4/021 |
| 2023/0093158 A1* | 3/2023 | Ivanov | G01S 5/02526 |
| | | | 342/457 |
| 2023/0176166 A1* | 6/2023 | Rauhala | G01S 5/013 |
| | | | 342/357.55 |
| 2023/0176226 A1* | 6/2023 | Rauhala | G01S 5/02526 |
| | | | 342/357.42 |
| 2023/0194729 A1* | 6/2023 | Nurminen | G01S 19/48 |
| | | | 342/357.63 |
| 2024/0056770 A1* | 2/2024 | Nurminen | H04W 4/021 |
| 2024/0069144 A1* | 2/2024 | Gao | G01S 5/02527 |
| 2024/0151806 A1* | 5/2024 | Ivanov | G01S 5/02523 |
| 2024/0154789 A1* | 5/2024 | Nurminen | H04L 9/0861 |
| 2024/0154790 A1* | 5/2024 | Nurminen | H04L 9/088 |

FOREIGN PATENT DOCUMENTS

| | | | | |
|---|---|---|---|---|
| CN | 117812533 A | * | 4/2024 | |
| EP | 3418763 A1 | * | 12/2018 | G01S 5/0252 |
| EP | 3764058 B1 | * | 8/2023 | G01C 21/206 |
| JP | 7479715 B2 | * | 5/2024 | H04W 4/021 |

* cited by examiner

METHODS AND SYSTEMS FOR IMPROVED DATA COLLECTION IN A POSITIONING SOLUTION THAT LEVERAGES CLOSED-LOOP LEARNING (CLL)

FIELD OF THE DISCLOSURE

Embodiments of the present disclosure relate to the field of positioning technologies, and more specifically to method(s) and system(s) for improved data collection.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure deployed in buildings and/or outdoors (e.g., Wi-Fi, Bluetooth, Base Station(s) etc.) as well as on existing capabilities in consumer devices, such as on radio technologies that are already supported in numerous consumer devices on the market, among other options.

One approach for such radio-based positioning could involve collection of radio "fingerprint(s)" from mobile devices, which may then be used for generating or updating radio map(s). A given fingerprint may include radio data representing measurements of radio signals respectively observed by the mobile devices, which may include received signal strength value(s), round-trip time value(s) and/or respective identifiers of radio node(s) emitting those signal(s) etc. Additionally, a given fingerprint may include a position estimate determined or obtained by the mobile device, which may be used for geo-referencing the radio data in the fingerprint so as to indicate a location where the radio data was collected. Such a position estimate may be, for example, based on Global Navigation Satellite System (GNSS) data, sensor data, and/or may be manually inputted via a user interface, among other options. Moreover, in some cases, a given fingerprint could include altitude and/or floor level data respectively representing an altitude of a mobile device and/or a floor of a building in which the mobile device is located, so as to enable a three-dimensional (3D) positioning solution (e.g., a radio map in conjunction with an altitude map representing e.g., an altitude profile of an indoor or outdoor area, or altitudes of building floors.)

Once a radio map is generated or updated based on collected fingerprint(s), the radio map may effectively model a radio environment in an indoor and/or outdoor area. In practice, this could enable an entity (e.g., a server or a mobile device) to determine characteristics of radio signals that are expected to be observable respectively at different locations in the area. Given this, the entity could compare further (e.g., radio) measurements from a device to the radio map, to estimate a position of that device in the area. In some cases, the entity could also use further altitude (e.g., pressure) data to determine an altitude of the mobile device and/or a floor of a building in which the mobile device is located, among other options.

Generally speaking, the collection of data could involve a dedicated data collection process and/or a crowdsourcing process. A crowdsourcing process could involve mobile devices of a large number of consumers automatically transmitting fingerprint(s) to a positioning server that is collecting the fingerprint(s). Whereas a dedicated data collection process could involve manual exhaustive radio-surveying of streets and/or buildings, including various floors, spaces and/or rooms etc. In this regard, a space owner and/or other individual(s) could actively survey area(s) so as to enable collection of fingerprint(s) for those area(s). For instance, an individual could actively survey a building so as to help generate at least an initial radio map for the building, which could then be further improved via further active surveying and/or crowdsourcing.

SUMMARY

In practice, a guidance user interface (UI) displayed on a mobile device may guide a user through a dedicated data collection process, such as towards area(s) of interest for collection of radio data, which is geo-referenced with position and/or altitude estimate(s). An example of such a guidance UI is described in more detail e.g., in the commonly assigned U.S. patent application Ser. No. 17/116,568, filed on Jun. 22, 2020, and entitled "Method and apparatus for guiding probe data collection," the entire contents of which are herein incorporated by reference.

In some situations, however, a mobile device may not be able to obtain e.g., a sufficiently accurate position estimate for geo-referencing purposes as the mobile device may rely on a GNSS-based position estimate, which may be unavailable or inaccurate in an indoor space or in urban canyons. Given this, if e.g., the position uncertainty becomes sufficiently large and/or a significant extent of time has passed since the most recent absolute position estimate, the guidance UI may request a manual position indication to be provided via a map displayed on the mobile device or may request the user to move to an area (e.g., an outdoor area that is not in an urban canyon) where a sufficiently accurate GNSS position estimate is available. Such a position estimate could then be extended using motion sensor data via sensor fusion techniques. Yet, accuracy of sensor fusion-based position estimate may degrade quickly (e.g., after losing GNSS service) and tends to be unusable within minutes or even seconds, thereby requiring guidance UI to again guide the user to e.g., visit an outdoor area or provide a manual position indication, and so on. The guidance UI may need to do so frequently enough to compensate sensor drift, which can make the collection process laborious and not user-friendly.

Similarly, in some situations, a mobile device may not be able to obtain e.g., a sufficiently accurate altitude estimate for geo-referencing purposes as the mobile device may rely on a GNSS-based altitude estimate, which may be unavailable or inaccurate in an indoor space or in urban canyons. Given this, if e.g., the altitude uncertainty becomes sufficiently large and/or a significant extent of time has passed since the most recent absolute altitude estimate, the guidance UI may request a manual altitude or floor level indication to be provided via the mobile device. Additionally or alternatively, the guidance UI may request the user to move to an area where a sufficiently accurate GNSS-based altitude estimate is available and/or an area where an altitude map-based altitude estimation is possible. Such an altitude estimate could then be combined with pressure data from a barometer for further altitude estimation e.g., indoors. Yet, barometer-based pressure estimation may also drift, which could lead to inaccurate further altitude estimation and thus the need for the guidance UI to repeatedly guide the user to e.g., visit an outdoor area or provide a manual altitude or floor level indication. Here again, this challenge can make the collection process laborious and not user-friendly.

To help avoid the need for repeated visit(s) to e.g., GNSS-enabled area(s) and/or repeated manual position indication(s), collection techniques have been developed that leverage closed-loop learning (CLL). In a CLL-based approach, the radio map learning process utilizes a feedback loop as already collected data is used to improve the quality of new incoming data. In this way, the CLL-based approach could help cope with sensor drifting in sensor fusion-based mapping of areas where a sufficiently accurate (e.g., GNSS) position estimate is unavailable. Such a CLL-based approach could take various forms.

For example, a CLL-based approach could involve (i) learning 'landmark' positions or altitudes (e.g. radio node positions, radio node altitudes, or ground level altitudes of various positions) using 'initial phase' sensor fusion estimates and then (ii) utilizing the learned landmark positions or altitude respectively in combination with motion or barometer sensor data for determining further sensor fusion estimates.

In another example, when there is not yet any radio map for a collection area, positions are initially estimated based on GNSS and sensors only. And as soon as this learning has produced radio models that are considered reliable enough (e.g. are based on sufficient number of reliable data points), the sensor fusion is improved with wireless network-based position estimates. For instance, a position may be estimated based on radio measurement(s) and the learned radio model, and can be leveraged for geo-referencing purposes without the need for a user to be guided to a GNSS-enabled area e.g., outdoors. This position estimate and motion sensor data can then be used for further position estimation e.g., in an indoor space, and so on. In some implementations of CLL, however, the position estimate at issue can be additionally or alternatively refined by other source(s) of location information, such as a manual location indication or perhaps a GNSS-based position estimation (when available), among other possibilities.

Similarly, when there is not yet any altitude map for a collection area, the altitude profile of the area is estimated based on GNSS and barometer only. And as soon as this learning has produced an altitude map estimate that is considered reliable enough (e.g. the learned altitudes are based on sufficient number of reliable data points), the sensor fusion is complemented with altitude map-based altitude estimates (e.g., in an outdoor area having a varying altitude profile).

Example implementations of a CLL-based approach are described in more detail in the following commonly assigned patent applications: (i) U.S. patent application Ser. No. 17/195,940, filed on Mar. 12, 2020 and entitled "Updating a radio map based on a sequence of radio fingerprint," the entire contents of which are herein incorporated by reference; (ii) U.S. patent application Ser. No. 15/441,357, filed on Feb. 24, 2017 and entitled "Precise altitude estimation for indoor positioning," the entire contents of which are herein incorporated by reference; and (iii) U.S. patent application Ser. No. 17/058,568, filed on May 28, 2018 and entitled "Multilevel altitude maps," the entire contents of which are herein incorporated by reference. Other implementations are possible as well.

Regardless of the implementation, CLL-based data may be given a higher weight in radio or altitude map learning, as accuracies of CLL-based position and/or altitude estimates are better than accuracies of position and/or altitude estimates that do not benefit from CLL e.g., such as those in the above-described initial learning phase. However, although a CLL-based approach may provide for various benefits, such an approach may also have some deficiencies.

By way of example, under a CLL-based approach, data collected before an initial map has been formed is less valuable due to less accurate reference locations than the data items whose reference locations have been refined by a CLL-based map. In other words, it is typically not possible to improve initial-phase sensor fusion position and/or altitude estimates that have already been incorporated in a map, because such data in the map of an area can't be re-computed, thereby resulting in lower value (e.g., accuracy) position and/or altitude estimates in the initial map. And since a guidance UI is often configured to guide a user (e.g., to GNSS-enabled area(s)) based on position uncertainty and/or time as discussed, a user might initially collect an unnecessarily large amount of data that has not been improved with CLL learning. Such initially collected data may be less valuable for the mapping process and possibly could even adversely affect the eventual map quality. Therefore, an improvement to CLL-based approaches is desired.

To help overcome this issue, disclosed herein is an improved approach for data collection in a positioning system that leverages CLL. The disclosed approach involves a multi-phase process to quickly form and then leverage a reliable initial map.

In a first phase of the process, a guidance UI may guide a user to focus the data collection solely on specific "seed" area(s). Such area(s) could be selected according to pre-defined criteria and/or selected by the user. In either case, the initial phase may be of limited duration and may effectively focus the collection effort to limited area(s). In this way, the initial phase could be configured to limit the amount of lower value data that is being collected while ensuring that an initial map is learned locally and rapidly for use in CLL.

Then, in a second phase of the process (e.g., after an initial map representing at least the seed area(s) has been formed), the guidance UI may initiate a second phase of the process where the guidance UI guides the user to collect data outside of the seed area(s), but to also visit the seed are(s) regularly (or any other area(s) deemed to have sufficient amount collected data for use in CLL). Due to such regular visit(s), the disclosed process would then leverage the initial map and CLL to expand the mapped area over time while producing more high-quality data compared to previously-developed CLL approaches. Other advantages are also possible.

Accordingly, in one aspect, disclosed is a method. The method involves: causing a mobile device to provide a user interface (UI) that enables a data collection process, the data collection process being for collection of one or more of radio data or altitude data; executing a first phase of the data collection process for a space, where first phase comprises collection of radio and/or altitude data only in one or more seed areas, the one or more seed areas being associated with generation of an initial map, and where executing the first phase comprises providing a first representation of the UI that sets forth guidance to collect radio and/or altitude data only in the one or more seed areas; detecting, by the one or more processors, a trigger to end the first phase; and in response to detecting the trigger, executing, by the one or more processors, a second phase of the data collection process in the (e.g., indoor) space, where the second phase comprises collection of radio and/or altitude data in one or more secondary areas different from the one or more seed areas, the one or more secondary areas being associated with generation of an updated map, and where executing the second phase comprises providing a second representation of the UI that sets forth guidance (i) to collect radio and/or altitude data in the one or more secondary areas and (ii) to visit one or more of the seed areas and/or one or more other areas that are deemed to be ready but are different from the one or more seed areas.

In another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method(s), among others.

In yet another aspect, disclosed is a non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s). In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
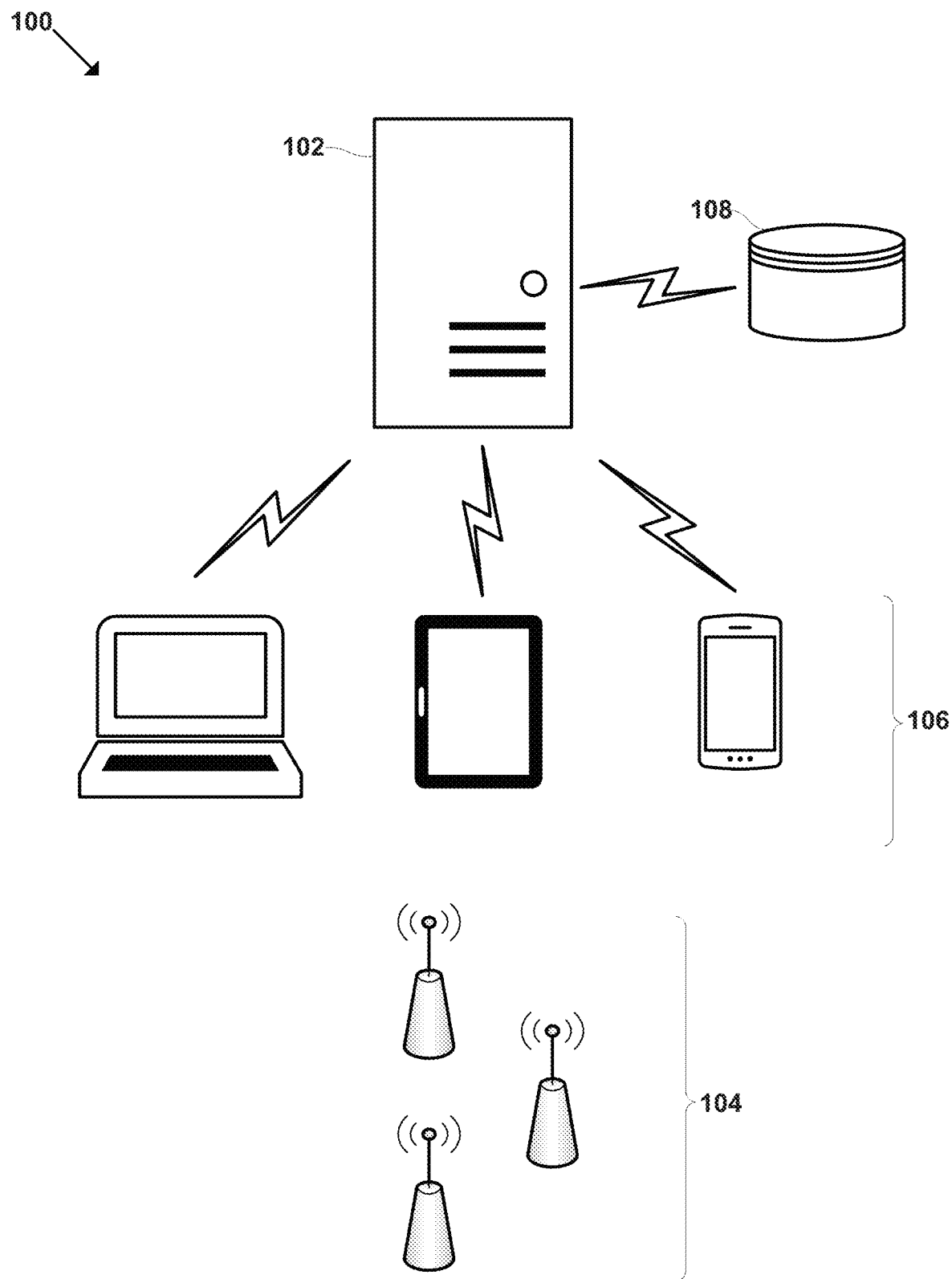
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. EXAMPLE SYSTEM(S) FOR INDOOR AND/OR OUTDOOR POSITIONING

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102 (could also be referred to as server(s) or the like), radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options. In some cases, a mobile device could also be referred to as a handheld device or a user device, among other possibilities.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
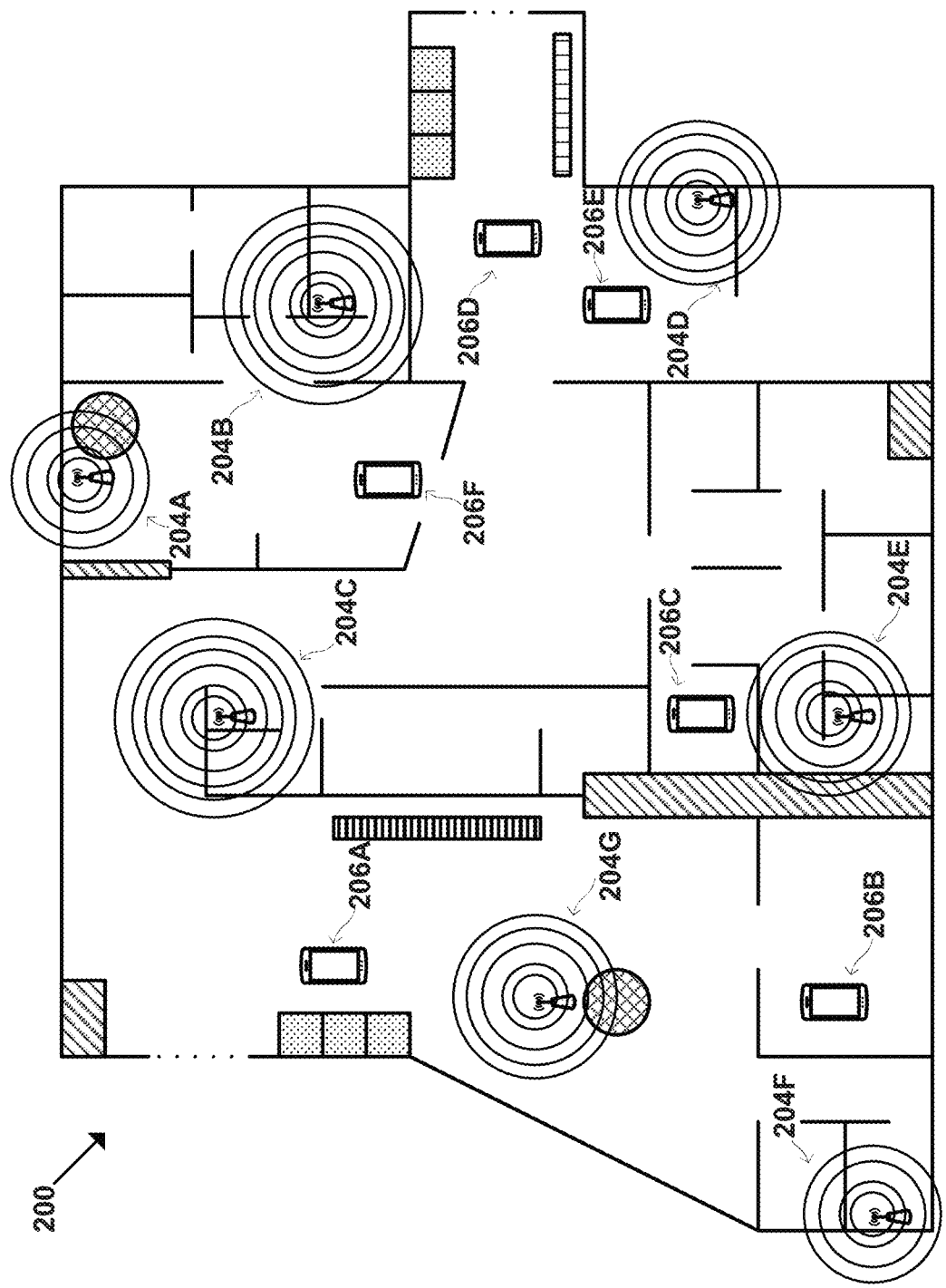
FIGS. 2A and 2B illustrate an indoor area at which radio device(s) and mobile device(s) can be located, in accordance with an example implementation.
Figure 2B:
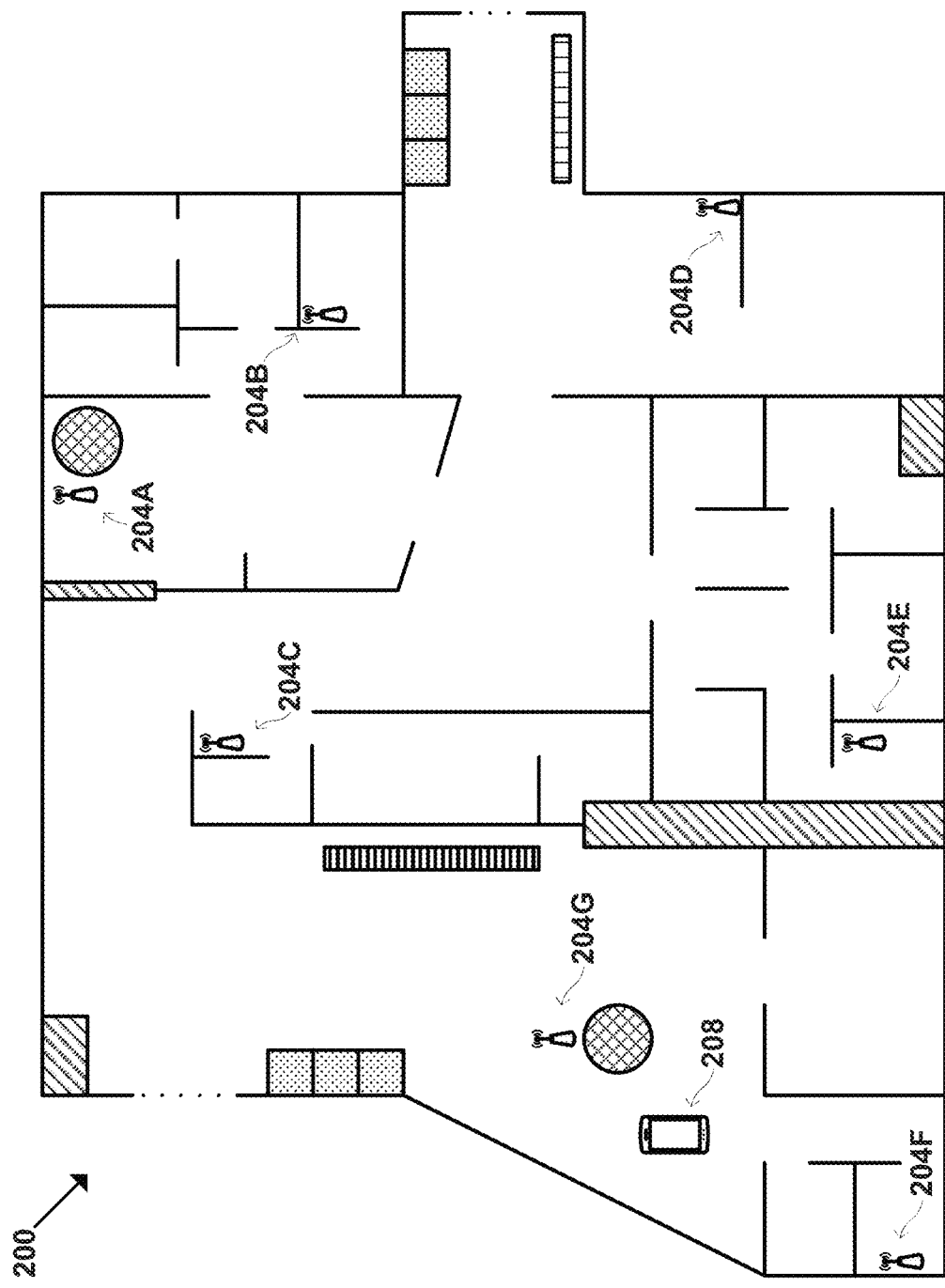
Figure 2C:
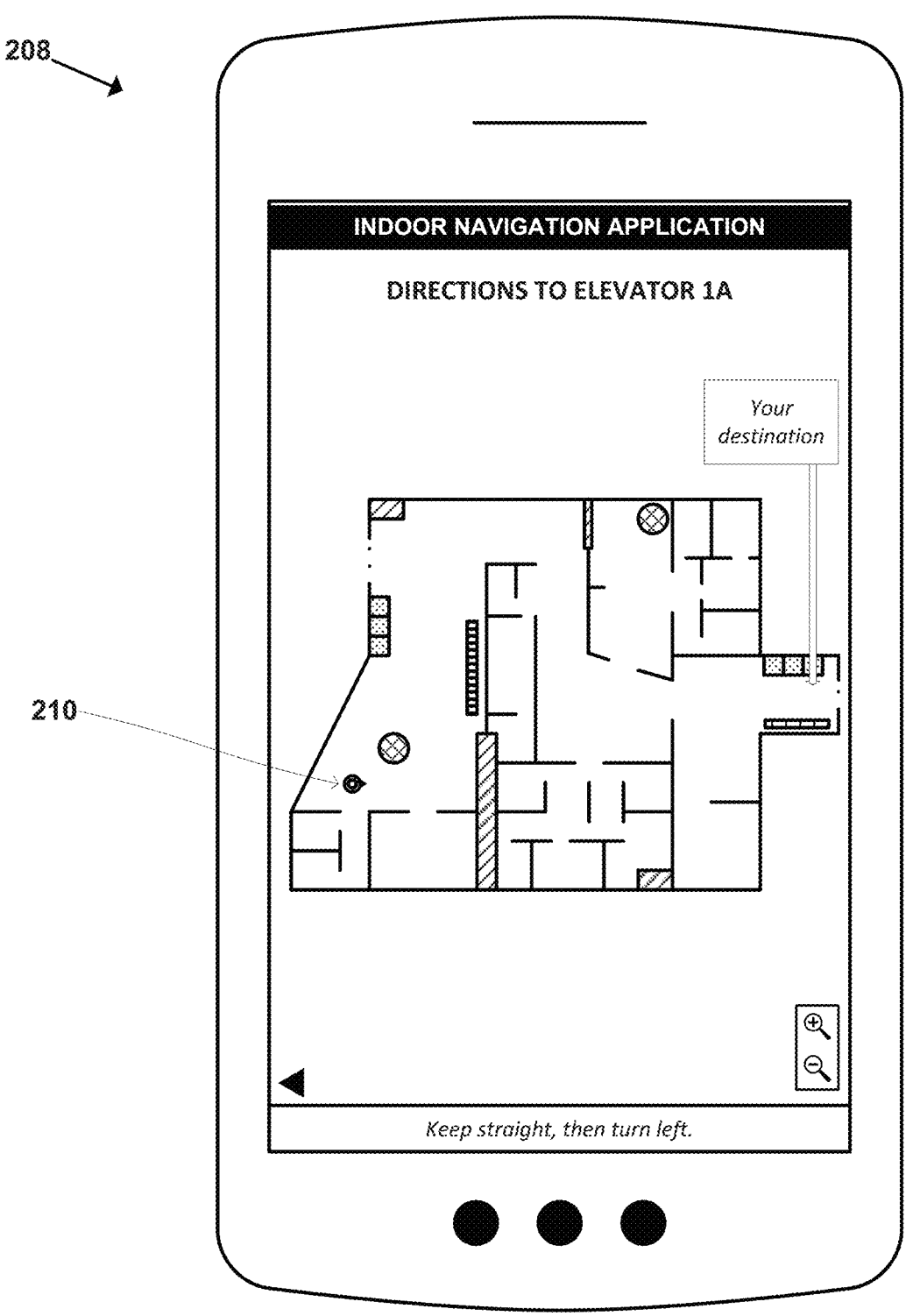
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. EXAMPLE METHOD(S) FOR IMPROVED DATA COLLECTION

As noted, the present disclosure is directed to an approach for improved data collection in a positioning system that leverages Closed-Loop Learning (CLL). This approach involves a multi-phase process to quickly form and then leverage a reliable initial map.

In line with the discussion above, the disclosed approach may involve a mobile device providing a guidance user interface (UI) that guides a user through data collection in accordance with the multi-phase process. By way of example, the mobile device could display, via a display device, an application program having visual interface feature(s) configured to provide guidance in accordance with the multi-phase process via representation(s) of the UI. In some implementations, however, the mobile device could additionally or alternatively provide the guidance UI in a non-visual form that includes audible and/or haptic feature(s), among other options.

Moreover, the multi-phase process at issue could be executed by processor(s) of the mobile device and/or of server device(s) (e.g., of positioning server(s)), among other possibilities. For instance, the mobile device could execute the multi-phase process in accordance with program instructions associated with the application program and without any instruction(s) from the server device(s). In another implementation, however, the server device(s) could provide, to the mobile device, instruction(s) associated the multi-phase process, and the mobile device could in turn execute the multi-phase process in accordance with the received instruction(s). In either case, the mobile device could e.g., provide collected data (e.g., radio fingerprint(s)) to the server device(s) for purposes of radio map generation at any point during and/or after execution of the multi-phase process at issue. Other implementations are possible as well.

In a system arranged as described, the mobile device could execute a first phase of the process, which could involve collection of data (e.g., geo-referenced radio data and/or altitude data) only in seed area(s) of a space (also referred to herein as a collection area or the like). Before and/or during execution of the first phase, the seed area(s) could be programmatically defined in one or more of various ways. Although some implementations for defining the seed area(s) are described, it should be understood that other implementations may be possible as well.

In one implementation, the mobile device could provide a representation of the guidance UI that includes interface feature(s) for receiving user-input indicating characteristic(s) of seed area(s), so that the mobile device could receive (e.g., from a user) user-input defining the characteristics. Such characteristic(s) may include but are not limited: (i) respective locations of seed areas, (ii) respective shapes of seed areas, (iii) respective sizes of seed areas, (iv) a number of seed areas, (v) respective distances between seed areas, (vi) desired proximity of a given seed area to an entrance of a space, and/or (vii) desired distance of a given seed area away from a tall building (e.g., having a height exceeding a threshold height). Other characteristics are also possible.

In a more specific example, the guidance UI could request a user to define seed area(s) via a map of the collection area that is displayed on the UI. This could involve e.g., instructing the user to manually designate select area(s) of select floor(s) in an indoor map of a collection venue as seed area(s). And in the outdoor context, this could involve e.g., instructing the user to manually designate seed area(s) by delimiting an outdoor area. In practice, the user could provide such input to application via touch gesture(s), entry of information into pre-defined data fields, and/or audible commands, among other possibilities.

In another implementation, the mobile device and/or server device(s) could automatically define the seed area(s), such e.g., at least partially in accordance with pre-defined criteria. For example, the mobile device and/or server device(s) could designate seed area(s) at location(s) that meet pre-defined criteria, such as location(s) near entrance(s) to a building. Additionally or alternatively, the mobile device and/or server device(s) could designate a pre-defined number (e.g., three) of seed area(s) to have pre-defined shape(s), size(s), and/or relative distance(s), among other characteristic(s). In some cases, however, at least some characteristic(s) could be manually defined via user-input, and the mobile device and/or server device(s) could automatically determine other characteristics of the seed area(s) in the context of the user-defined characteristics. For instance, user-input could be provided (e.g., upon request) to indicate the number of seed area(s), and the mobile device and/or server device(s) could then determine remaining characteristic(s) for that number of seed area(s). Other examples are also possible.

In some implementations, the disclosed approach could involve determining whether sufficiently reliable map (e.g., radio and/or altitude) data already exists for the seed area(s) and/or other area(s) in the space where the data collection process is taking place. In practice, sufficiently reliable map data could involve a map area e.g., meeting a collection standard, such as by having (i) an associated data quality that is at or higher than a threshold quality level or (ii) an associated data quantity that is at or higher than a threshold quantity level (e.g., at least a threshold number of data points and/or models for a given area). So, when a given area is determined to have sufficiently reliable map data, that area could be deemed to be a 'ready' area. Otherwise, when a given area is determined to not have sufficiently reliable map data, that area could be deemed to be a 'non-ready' area. Other implementations are also possible.

Given this, the application program could communicate with server device(s) (e.g., a server instance) that store map data for the space at issue so as to check whether sufficiently reliable map data already exists for the seed and/or other area(s) at issue. In particular, the server device(s) could evaluate the manually and/or automatically defined seed area(s) and inform the application program regarding whether and/or which of the seed area(s) already have or don't have sufficiently reliable map data. In some cases, the server device(s) could also evaluate other area(s) e.g., within a pre-defined radius of the mobile device's current location (or within pre-defined boundaries of the entire collection area) and could inform the application program regarding whether and/or which of the other area(s) already have or don't have sufficiently reliable map data. In turn, the application program could display information visually indicating (e.g., via a map of the collection area) regarding which seeds and/or other area(s) do and/or don't have sufficiently reliable map data. In this way, a user could know which area(s) require additional data collection ('non-ready' area(s)) and/or which area(s) area ready for use in CLL ('ready' area(s)).

Once seed area(s) have been defined or otherwise selected, the mobile device (or more specifically the application program) could instruct the user to collect data only in seed area(s). More specifically, the first phase of the disclosed process could involve providing a first representation of the UI that sets forth guidance to collect data only in the seed area(s), to enable generation of an initial map. As discussed herein, for purposes of radio map generation, such collected data could include measurement(s) of node(s) as well as position and/or altitude estimate(s) for geo-referencing purposes (e.g., taking the form of radio fingerprint(s) or the like). And in the context of altitude map generation, such collected data could include at least altitude estimate(s) and possibly position estimate(s) that each may provide a reference to indicate where a respective altitude estimate has been obtained, thereby enabling generation of an altitude map indicating altitude(s) respectively at various locations (e.g., an altitude profile of a collection area.)

More specifically, the application program could guide the user to seed area(s) in various ways. For example, the application program could specify a given one of the seed areas to which the user should move in order to collect data in that given seed area. And once some time has passed, the application program could specify a different one of the seed areas to which the user should move in order to collect data in that different seed area. In another example, the application program could indicate that the user should collect data only in seed area(s), but without specifying any particular seed area to which the user should move, so that the user can independently select the order for visiting seed areas during the data collection. In either case, the application program could explicitly request collection at seed area(s) that are not yet deemed to be 'ready' for use in CLL i.e., that were deemed to not yet have sufficiently reliable map data (e.g., the application program could visually display an instruction indicating "Go to the nearest seed area that has not been marked as ready".) Other examples are also possible.

Moreover, the first phase at issue could be configured to be executed only for a pre-defined limited time period. In particular, the application program could be configured to minimize the duration of the initial phase, where the data is of lower value due to imprecise sensor fusion-based reference position(s). By way of example, the application program could do so by displaying a timer indicating the remaining time (e.g., 5 minutes) for collecting data during the first phase. In practice, the application program could display a timer for the entirety of the first phase, so as to limit the collection duration for the first phase. Additionally or alternatively, the application program could display a respective timer e.g., on a per seed area basis, so as to limit the collection duration respectively for each seed area. In any case, the limited duration may help focus the data collection efforts to limited area(s) and ensure that an initial map is learned as rapidly as possible, thereby limiting the amount of lower value data that is collected while still enabling use of CLL.

During and/or after the first phase, the mobile device could transmit collected data to server device(s) (e.g., positioning server(s)) so that the server device(s) can use the collected data as basis to generate an initial (e.g., radio and/or altitude) map in accordance with embodiments described herein. In practice, this initial map may be representative of at least the seed area(s) for which data has or is being collected during the first phase. However, the initial map may (optionally) also represent other area(s), such as other 'ready' area(s) deemed to have sufficiently reliable map data as discussed above. In any case, server device(s) could generate at least a portion of the initial map as data is being collected, after all data has been collected for all the seed area(s), and/or after a sufficient extent of data has been collected in one or more of the seed area(s) for use in CLL. Moreover, in some cases, server device(s) could also generate the initial map based on data that may have been collected by other device(s) (e.g., as part of a separate crowdsourcing process) in the seed and/or other area(s) of the (e.g., outdoor and/or indoor) space.

In accordance with the present disclosure, the mobile device could detect a trigger to end the first phase of the multi-phase process disclosed herein. For example, detecting the trigger could involve detecting that the first phase has been executed for a duration that meets or exceeds the above-described limited time period. Additionally or alternatively, detecting the trigger could involve determining that data collected in the seed area(s) meets a collection standard for generation of the initial map (e.g., that seed area(s) are deemed to be 'ready' e.g., after previously being deemed to be 'non-ready'). This collection standard could be e.g., that the quality of the data is higher than a pre-defined threshold quality level and/or that the quantity of data is higher than a pre-defined threshold quantity level, among other possibilities.

By way of a more specific example, the mobile device could detect the trigger by determining both (i) that a 10-minute limited time period for the first phase has expired and (ii) that at least 100 data points have been collected respectively for each seed area. In some cases, the mobile device (or more specifically the application program) could be configured to extend the limited time period for the first phase if the mobile device determines that the quality and/or quantity of the collected data do not respectively meet the pre-defined collection standard(s).

Once the mobile device detects a trigger to end the first phase, the mobile device could responsively initiate or otherwise execute a second phase of the multi-phase process.

As noted, the second phase may include collection of data in secondary area(s) other than seed area(s), with occasional visits to e.g., seed and/or other 'ready' area(s) for geo-referencing purposes as part of CLL. In practice, a secondary area could be any feasible area within the space (collection area) that is not a seed area and where additional data collection is deemed necessary (e.g., an area deemed to be 'non-ready' due to failing to meet the collection standard). In some cases, the application program could provide explicit instruction regarding which specific secondary area(s) the user should move to for purposes of further data collection. In other cases, the application program could provide e.g., a map indicating extent of data collection in various parts of the space (e.g., a map indicating 'ready' vs. 'non-ready' area(s)), so that the user can independently decide on the secondary area(s) where the user should move to for purposes of further data collection. Numerous other cases may also be possible.

Accordingly, in the second phase, the application program may set forth guidance, via another representation of the UI, to (i) collect data in secondary area(s) and (ii) to visit seed area(s) and/or other area(s) deemed to be 'ready' (i.e., have sufficiently reliable map data to enable CLL). For instance, the UI could guide the user through a cycle of moving between 'ready' and 'non-ready' area(s) (i.e., the user may be requested to move between areas regularly.)

More specifically, the UI could provide instructions to move to a particular 'ready' (e.g., seed) area or to any 'ready' area of the user's choice, so as to obtain an accurate reference position (and/or altitude) in this area (e.g., based on radio and/or altitude data associated with this 'ready' area). This reference position (and/or altitude) can be subsequently extended with location-related data from another source, such as motion (and/or pressure) data via sensor fusion techniques as the user moves to a 'non-ready' area. So, after the user has spent some time in the 'ready' area, the UI could provide instructions to move to a 'non-ready' area for further collection of data refined by CLL. In the context of radio map generation, the further collected data could include e.g., radio measurement(s) that are geo-referenced with extended position and/or altitude estimates in accordance with CLL. And in the context of altitude map generation, the further collected data could include altitude estimates in 'non-ready' that are improved via CLL using 'known' altitude map parts e.g., in 'ready' area(s) in combination with e.g., barometer measurement(s) and/or GNSS-based altitude estimates (when available), among others.

In this regard, time spent respectively in each area may vary depending on the implementation. For example, the UI could be configured to instruct a user to visit a 'ready' area e.g., for a first pre-defined time period and/or could be configured to instruct the user to visit a 'non-ready' area e.g., for a second pre-defined time period, which could be based on e.g., a pre-defined schedule or a pre-defined frequency of visitation, among other options. In practice, the first and second pre-defined time period could be the same as one another or different from one another. And, in some cases, different time periods could be established respectively for different instances or cycles of visiting 'ready' and 'non-ready' area(s). In another example, however, the time spent in a given area may not necessarily be pre-defined. Rather, the UI could be configured e.g., to instruct a user to visit a 'ready' area until the UI provides an indication that a sufficiently accurate (e.g., reference) position and/or altitude has been obtained, which may correspond to or otherwise be provided in conjunction with an instruction to move to a 'non-ready' area. Similarly, the UI could be configured e.g., to instruct a user to visit a 'non-ready' area until the UI provides an indication that an extended (e.g., reference) position and/or altitude is no longer sufficiently accurate, which may correspond to or otherwise be provided in conjunction with an instruction to move back to a 'ready' area for geo-referencing purposes, and so on.

During and/or after the second phase, the mobile device could transmit collected data to server device(s) (e.g., positioning server(s)) so that the server device(s) can use the collected data as basis to update the initial map in accordance with embodiments described herein. In practice, the updated map may include data for at least the seed and/or other 'ready' area(s) as well as for any other area(s) for which data has been collected during the first and/or second phases. At least some area(s) in the updated map can be deemed to have sufficiently reliable map data, but it is possible that other (e.g., secondary) area(s) in the updated map can be deemed to not yet have sufficiently reliable map data, thereby requiring further data collection in those area(s). In any case, server device(s) could generate the updated map as data is being collected during the second phase, after all data has been collected during the second phase, and/or after a sufficient extent of data has been collected in one or more of the secondary area(s) previously deemed to be 'non-ready'. Moreover, in some cases, server device(s) could also generate the updated map based at least in part on data that may have been collected by other device(s) (e.g., as part of a separate crowdsourcing process) in area(s) of the (e.g., outdoor and/or indoor) space.

Furthermore, throughout execution of the second phase, at least some 'non-ready' secondary area(s) may become 'ready' area(s) that can be leveraged as part of CLL. For example, the server device(s) could update the map based on data collected in a secondary area during the second phase and could determine that this area is now a 'ready' area due to meeting the collection standard (e.g., having a sufficiently reliable map data). In turn, the sever device(s) could provide information to the application program regarding this newly 'ready' area, and the application program could e.g., modify the UI representation of the map to visually indicate that the area is 'ready'. Additionally or alternatively, during the second phase, the application could guide the user to this area once it is 'ready' (and/or the user could decide to move to this area based on the visual indication of it being 'ready'), so as to obtain an accurate (e.g., reference) position and/or altitude as part of CLL. Other examples are also possible.

Accordingly, the second phase disclosed approach could enable generation of an updated map from the initial map, while ensuring a greater extent of higher quality data being collected compared to previous CLL-based approaches. Other advantages may also be possible.

Generally speaking, in line with the discussion above, the disclosed approach could be performed in the context of leveraging 'ready' (e.g., seed) area(s) for purposes of reference location (e.g., position and/or altitude) estimation in the context of radio map generation. In an example implementation of the multi-phase process in this context, a seed area could be a part of e.g., a building or a floor of the building. Additionally, in this context, seed area(s) could be respectively defined to be substantially proximate to (e.g., within a threshold distance of) entrance(s) of an indoor space, because such area(s) may be learned more rapidly due to their proximity to GNSS-enabled areas(s). Given this, the first phase in this context could involve e.g., providing guidance to walk through and/or between respective seed area(s) associated with entrance(s) and/or outdoor area(s) outside of the indoor space.

Additionally or alternatively, in line with the discussion above, the disclosed approach could be performed in the context of learning an altitude map e.g., representing an altitude profile of an indoor and/or outdoor area. In an example implementation of the multi-phase process in this context, a seed area could be any delimited outdoor area such as e.g., a set of 5 city street blocks. Such a seed area should be selected such that GNSS 'visibility' exists to enable a sufficiently accurate GNSS-based position estimation (e.g., at least a pre-defined threshold distance away from any tall building(s)). Moreover, distance(s) between such seed area(s) could be defined to avoid excessive barometer measurement drift as a user moves between seed areas (e.g., a 400-meter maximum distance between any two seed areas). In any case, when an altitude map of a seed area has been learned (i.e., the seed area is deemed to be 'ready'), the seed area can be leveraged for purposes of accurate altitude estimation. Such altitude estimation can be used for geo-referencing radio data as described herein and/or for improving accuracy of other (e.g., GNSS and/or barometer-based) altitude estimates, among others. Other implementations are also possible.

Figure 3:
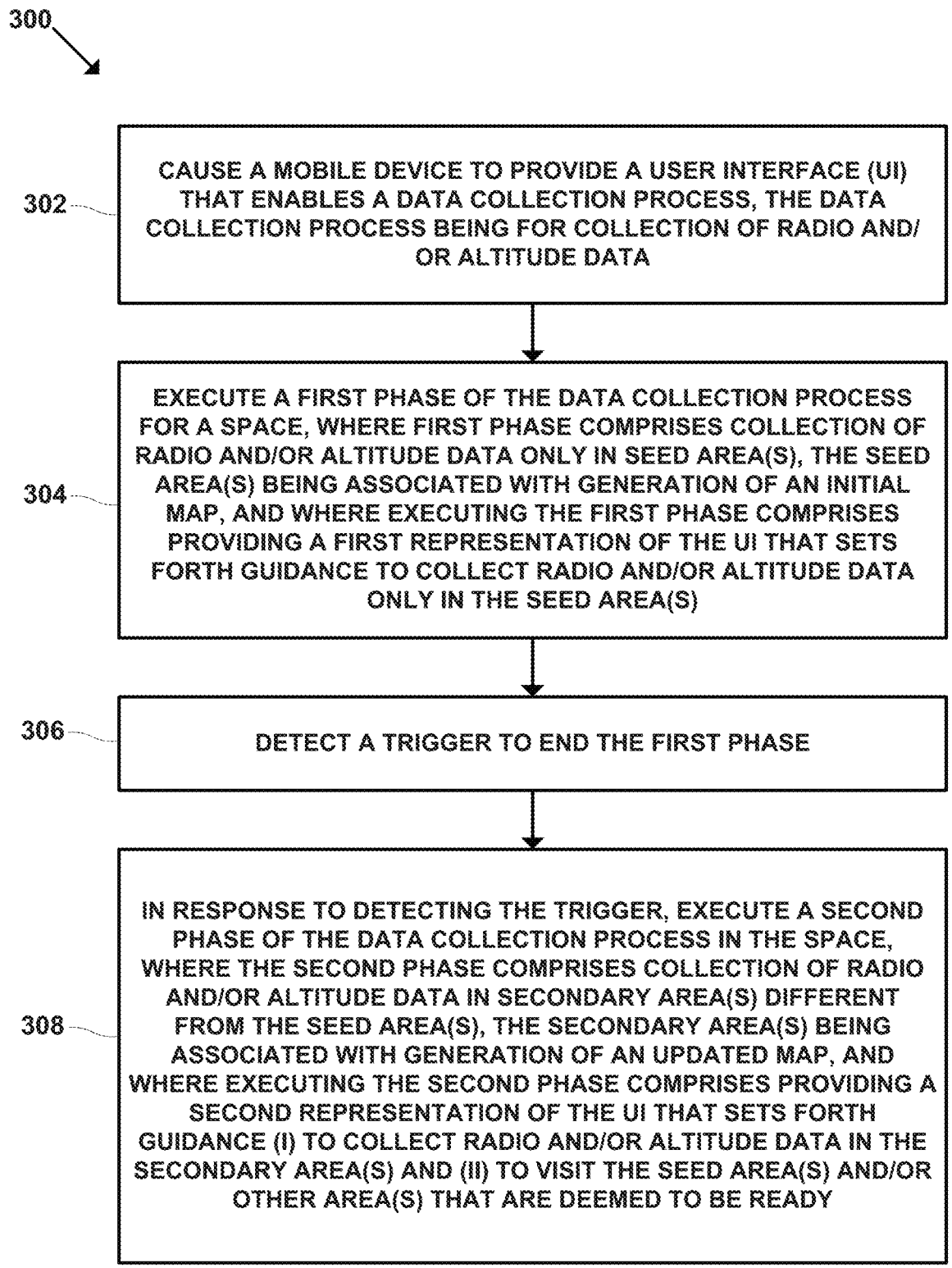
FIG. 3 is an example flowchart representing an approach for improved data collection, in accordance with an example implementation.

FIG. 3 is next a flowchart illustrating method 300 in accordance with the present disclosure. Such method(s) could be performed by and/or in an arrangement involving mobile device(s), server device(s), and/or any other device or system. Also, it should be understood that, if a given method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, operation(s) described herein could be distributed among entities, such as in accordance with a client-server arrangement or the like.

In some implementations, method 300 could be performed by and/or in arrangement(s) (e.g., arrangement 100) involving a device (e.g., mobile device 106) and/or a server (e.g., server system 102) or more particularly by component (s)/module(s) (e.g., processor(s)) thereof, among other possibilities. Other implementations are also possible.

As shown in block 302, method 300 may involve causing a mobile device to provide a user interface (UI) that enables a data collection process, the data collection process being for collection of radio and/or altitude data. At block 304, method 300 may involve executing a first phase of the data collection process for a space, where first phase comprises collection of radio and/or altitude data only in seed area(s), the seed area(s) being associated with generation of an initial map, and where executing the first phase comprises providing a first representation of the UI that sets forth guidance to collect radio and/or altitude data only in the seed area(s). Then, at block 306, method 300 may involve detecting a trigger to end the first phase. And at block 308, method 300 may involve, in response to detecting the trigger, executing a second phase of the data collection process in the space, where the second phase comprises collection of radio and/or altitude data in secondary area(s) different from the seed area(s), the secondary area(s) being associated with generation of an updated map, and where executing the second phase comprises providing a second representation of the UI that sets forth guidance (i) to collect radio and/or altitude data in the secondary area(s) and (ii) to visit the seed area(s) and/or other area(s) that are deemed to be ready.

Figure 4A:
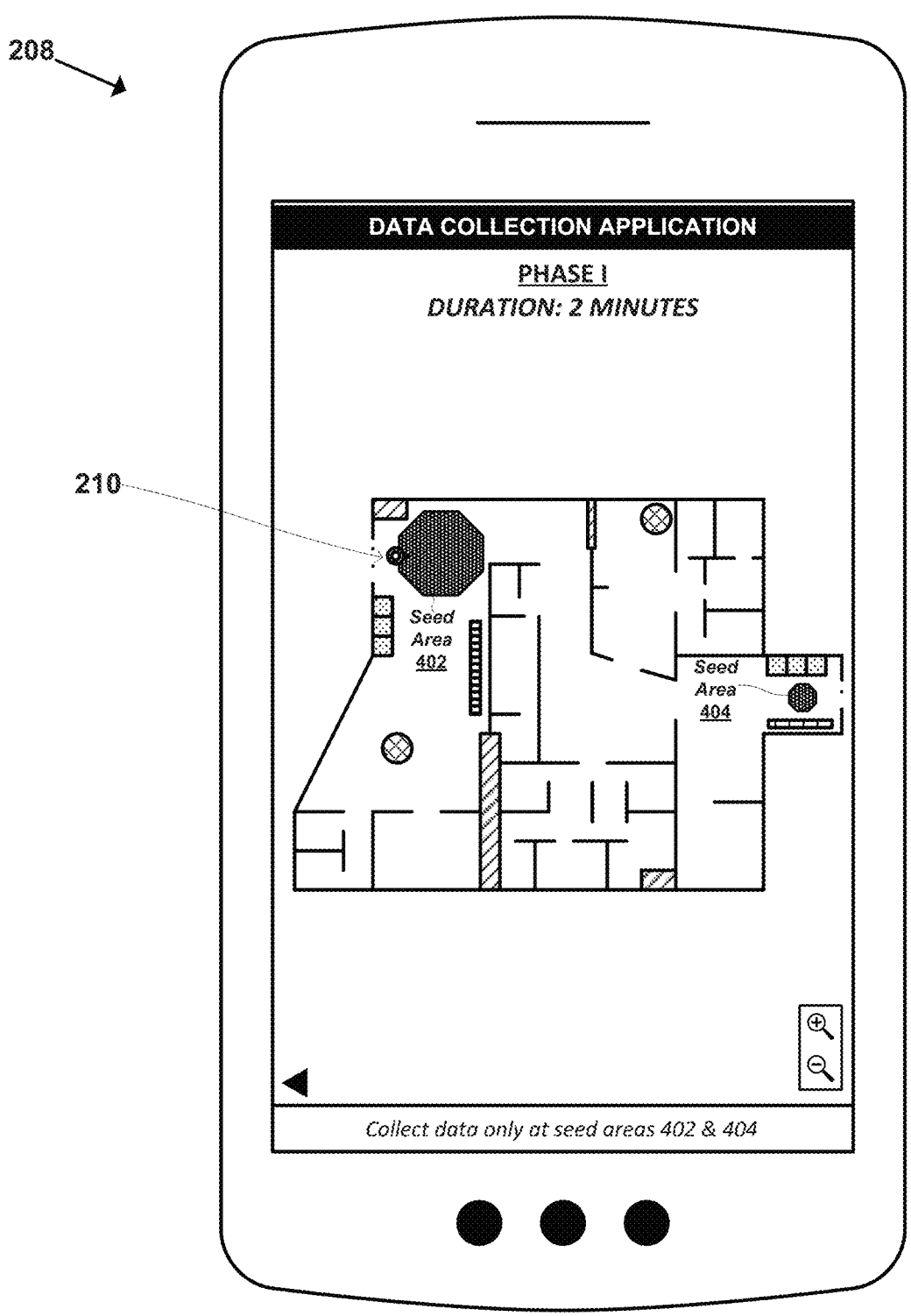
FIGS. 4A, 4B, and 4C illustrate example user interface representations for improved data collection, in accordance with an example implementation.
Figure 4B:
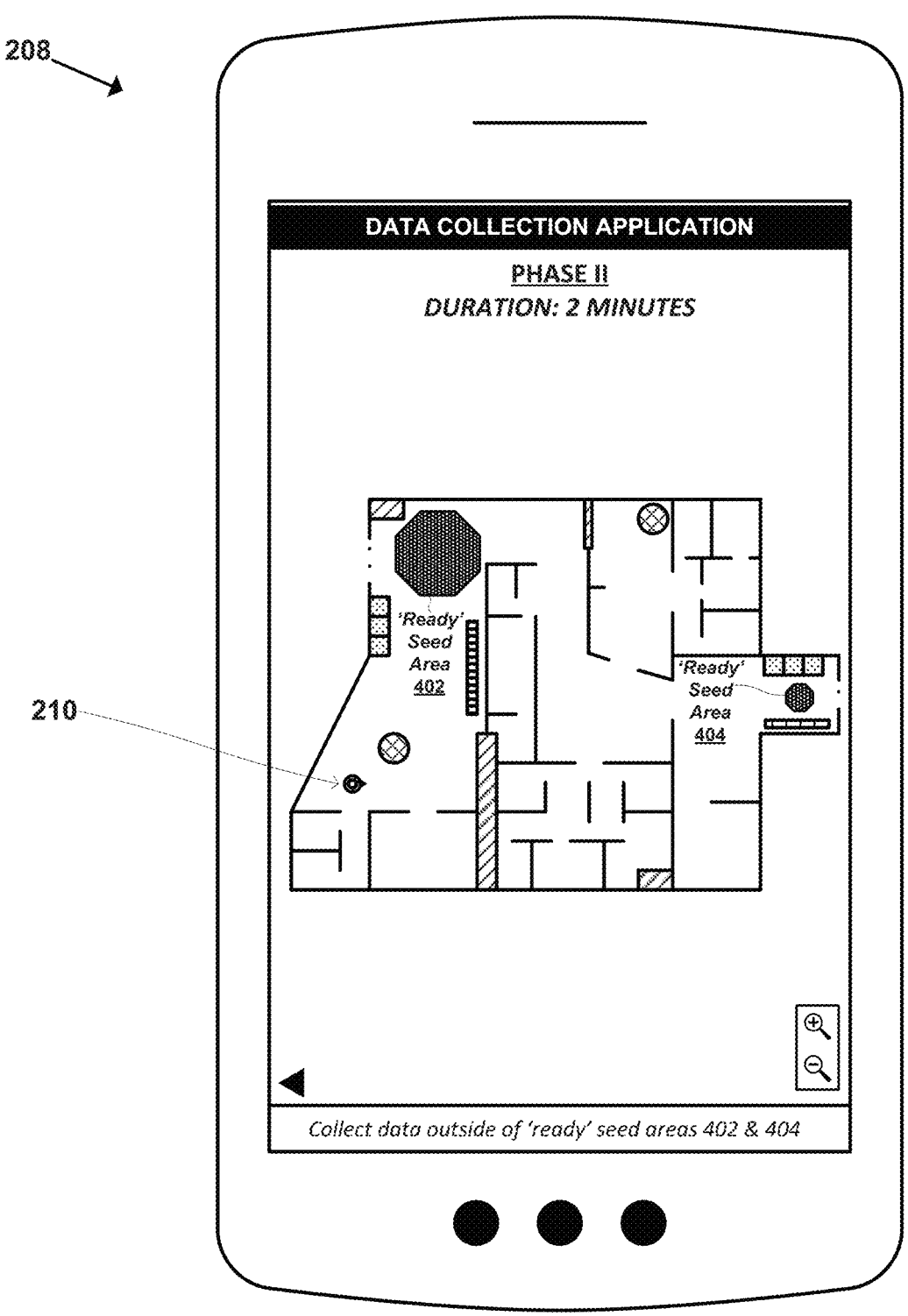
Figure 4C:
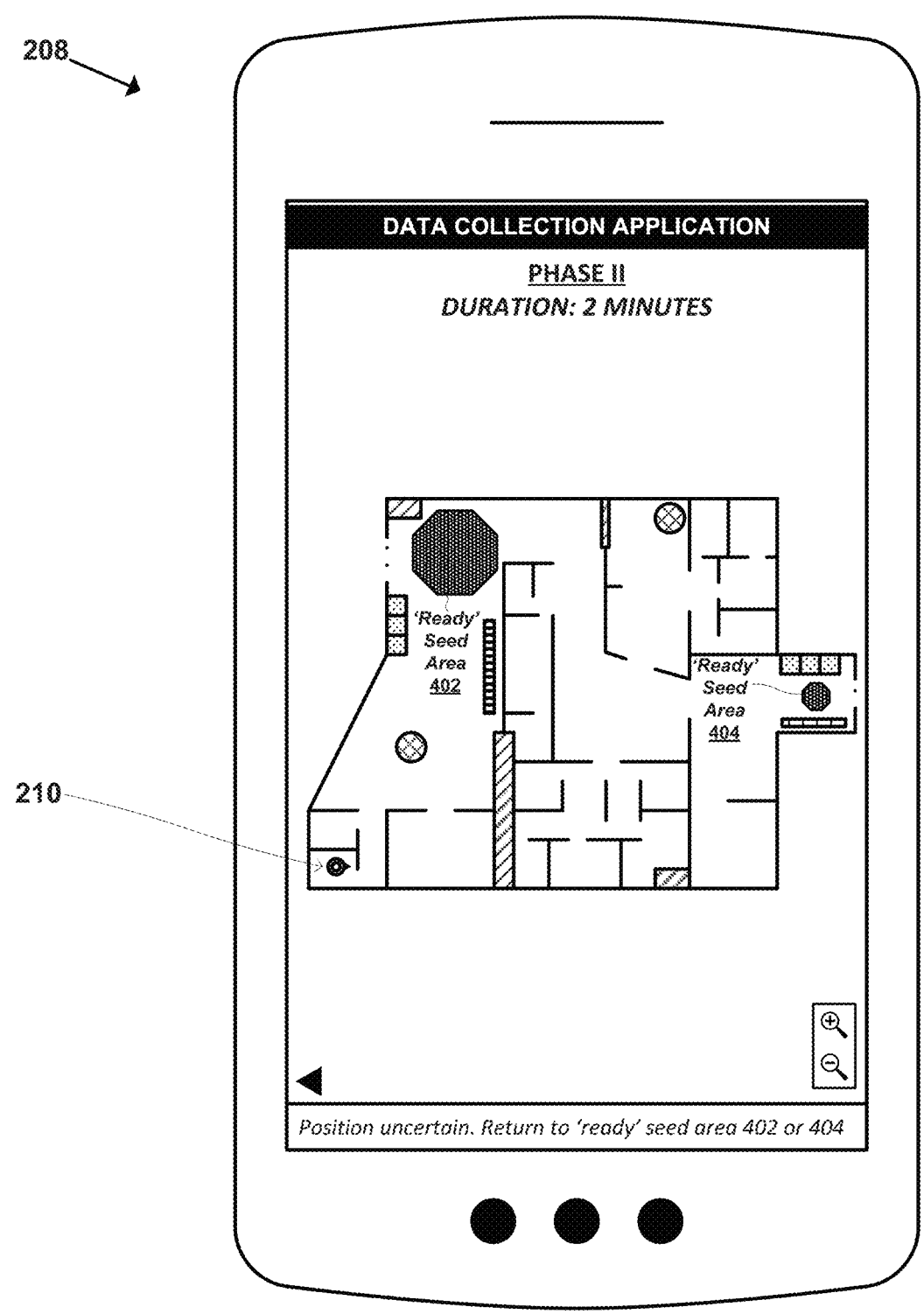

Furthermore, FIGS. 4A, 4B, and 4C illustrate example user interface representations for improved data collection, in accordance with an example implementation. In particular, FIG. 4A illustrates a mobile device 208 displaying an example UI representation that corresponds to the first phase of disclosed multi-phase process. As shown, the UI provides a request to "collect data only at seed areas 402 and 404" and sets a limited during of two minutes for execution of the first phase. In turn, a user collects data at seed area 402 as indicated by the visual indicator 210. Then, FIG. 4B illustrates the mobile device 208 displaying an example UI representation that corresponds to the second phase of disclosed multi-phase process. As shown, the UI provides a request to "collect data outside of 'ready' seed areas 402 and 404" and sets a limited during of two minutes for execution of the second phase. Indeed, visual indicator 210 indicates that the user is collecting data outside of the 'ready' seed areas 402 and 404. Finally, FIG. 4C illustrates the mobile device 208 displaying a modified example UI representation that also corresponds to the second phase of disclosed multi-phase process. As shown, the UI indicates: "position uncertain . . . return to 'ready' seed area 402 or 404" while the user is still outside of those areas as indicated by the visual indicator 210. Accordingly, the user may then move back to seed area 402 or 404 (not shown), which are deemed to be 'ready' in line with the discussion above, so as to obtain an accurate position and/or altitude estimate, and so on. Other illustrations are also possible.

III. EXAMPLE HARDWARE AND SOFTWARE

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
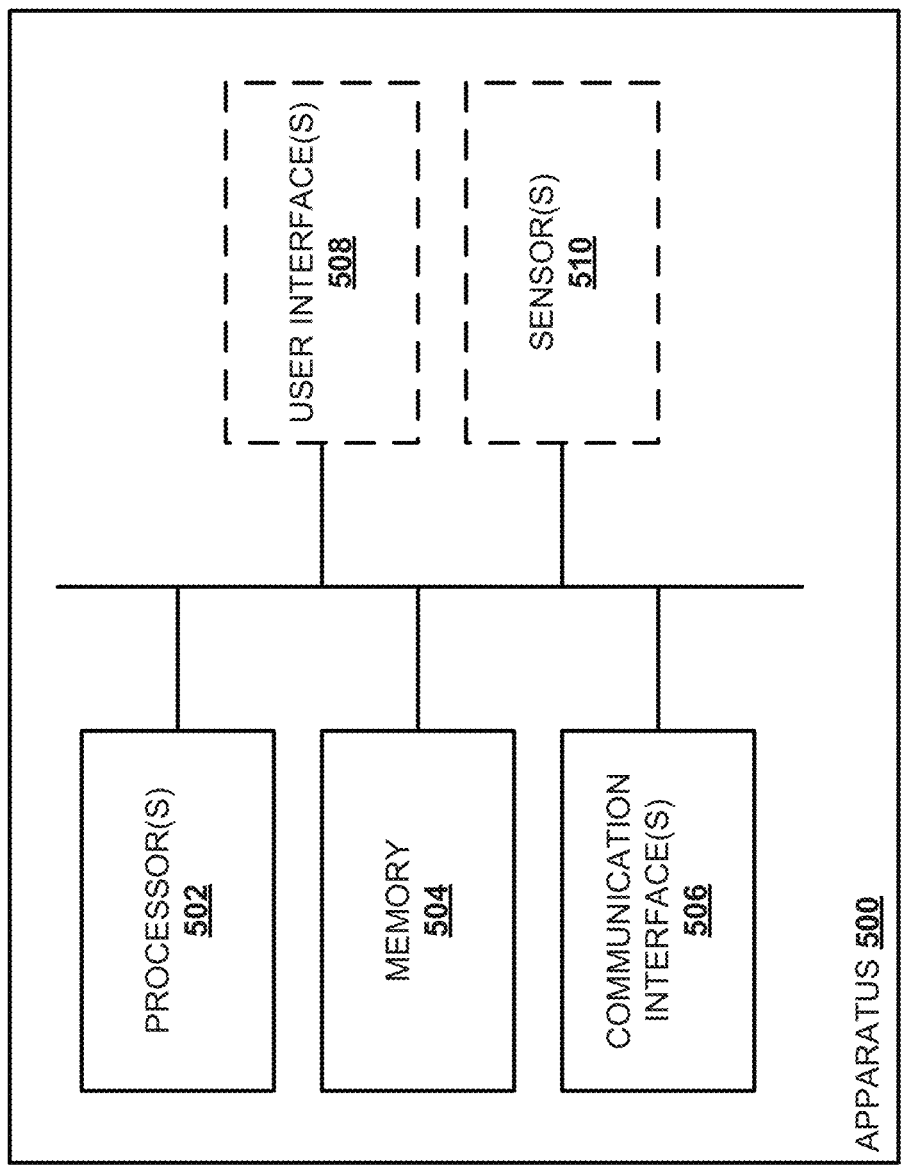
FIG. 5 illustrates an example apparatus, in accordance with an example implementation.

FIG. 5 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. EXAMPLE GEOGRAPHIC DATABASE

Figure 6:
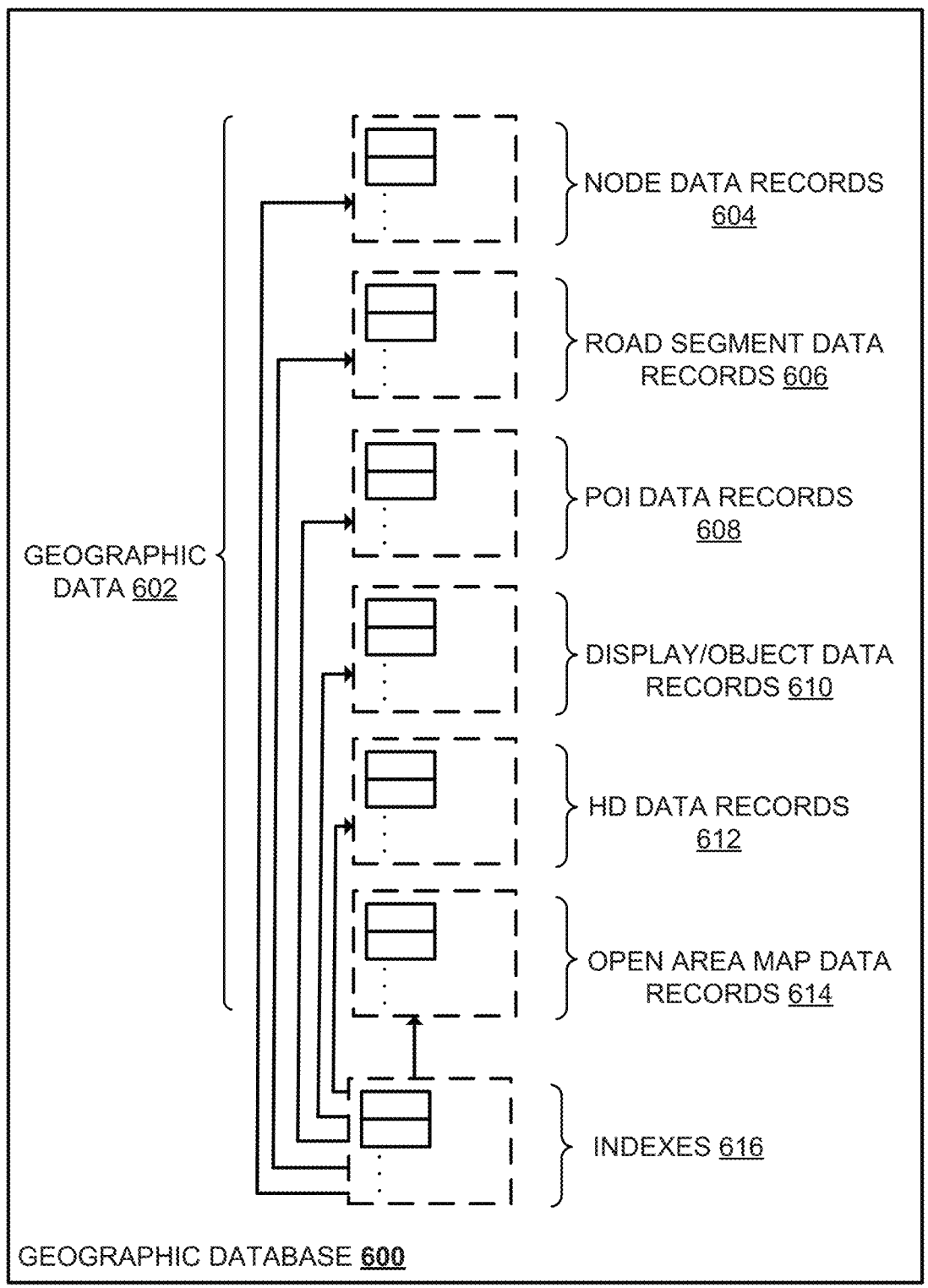
FIG. 6 illustrates a diagram of a geographic database, in accordance with an example implementation.

FIG. 6 illustrates a diagram of a geographic database 600, according to an example implementation. Geographic database 600 could be included within, integrated with, or be separate from another database, data storage device, memory, or the like described herein (e.g., memory 504). Additionally or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understood that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, or paths, as can be used in a calculated or recorded route information for determination of one or more personalized routes. The node data records 604 may be end points corresponding to the respective links or segments of the road segment data records 606. The road segment data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interfaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. CONCLUSION

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   causing, by one or more processors, a mobile device to provide a user interface (UI) that enables a radio data collection process for an indoor positioning system;
   executing, by the one or more processors, a first phase of the radio data collection process in an indoor space, wherein the first phase comprises collection of radio data only in one or more seed areas of the indoor space, the one or more seed areas being associated with generation of an initial radio map, and wherein executing the first phase comprises providing a first representation of the UI that sets forth guidance to collect radio data only in the one or more seed areas;
   detecting, by the one or more processors, a trigger to end the first phase; and
   in response to detecting the trigger, executing, by the one or more processors, a second phase of the radio data collection process in the indoor space, wherein the second phase comprises collection of radio data in one or more secondary areas different from the one or more seed areas, the one or more secondary areas being associated with generation of an updated radio map, and wherein executing the second phase comprises providing a second representation of the UI that sets forth guidance (i) to collect radio data in the one or more secondary areas and (ii) to visit one or more of the seed areas and/or one or more other areas that are deemed to be ready but are different from the one or more seed areas.

2. The method of claim 1, wherein causing the mobile device to provide the UI comprises causing the mobile device to display, via a display device of the mobile device, an application having visual interface features that enable the radio data collection process via at least the first and second representations of the UI.

3. The method of claim 1, wherein the first phase is configured to be executed only for a pre-defined limited time period, and wherein detecting the trigger comprises detecting that the first phase has been executed for a duration that meets or exceeds the limited time period.

4. The method of claim 1, wherein detecting the trigger comprises determining that radio data collected in the one or more seed areas meets a collection standard in association with the initial radio map, the collection standard corresponding to one or more of (i) a radio data quality being at or higher than a threshold quality level or (ii) a radio data quantity being at or higher than a threshold quantity level.

5. The method of claim 1,
   wherein the one or more seed areas are deemed to be ready due to meeting a collection standard, the collection standard corresponding to a given area having one or more of (i) an associated radio data quality that is at or higher than a threshold quality level or (ii) an associated radio data quantity that is at or higher than a threshold quantity level, and
   wherein the one or more other areas are also deemed to be ready due to also meeting the collection standard, and
   wherein the one or more secondary areas are deemed to be non-ready due to failing to meet the collection standard.

6. The method of claim 5, wherein, once radio data collected during the second phase causes a particular one of the secondary areas to meet the collection standard, the particular secondary area is deemed to be one of the other areas that is ready.

7. The method of claim 5, further comprising:
   providing, by the one or more processors, a modified representation of the UI that includes at least one interface feature for indicating which area is ready and which area is not ready in accordance with the collection standard.

8. The method of claim 1, further comprising:
   defining, by the one or more processors, characteristics associated with the one or more seed areas, wherein the characteristics comprise one or more of: (i) respective locations of seed areas, (ii) respective shapes of seed areas, (iii) respective sizes of seed areas, (iv) a number of seed areas, (v) respective distances between seed areas, (vi) proximity of a given one of the seed areas to an entrance of the indoor space, or (vii) a distance of a given one of the seed areas away from a building that has a height exceeding a threshold height.

9. The method of claim 8, further comprising:
providing, by the one or more processors, a modified representation of the UI that includes at least one interface feature for receiving user-input indicating one or more of the characteristics respectively for one or more of the seed areas; and
receiving, by the one or more processors via the modified representation of the UI, user-input indicating one or more of the characteristics respectively for one or more of the seed areas,
wherein defining characteristics associated with the one or more seed areas is based at least in part on the user-input received via the modified representation of the UI.

10. The method of claim 1, further comprising:
providing, by the one or more processors to an entity associated with the indoor positioning system, radio data collected during the first phase to enable generation of the initial radio map; and
providing, by the one or more processors to the entity, radio data collected during the second phase to enable generation of the updated radio map.

11. The method of claim 10, wherein the one or more processors are of the mobile device, and wherein the entity comprises one or more servers of the indoor positioning system.

12. The method of claim 1,
wherein the initial radio map is generated based at least on radio data collected during the first phase, and
wherein the updated radio map is generated based at least on (i) the initial radio map and (ii) radio data collected during the second phase.

13. The method of claim 1, wherein the second phase further comprises using geo-referenced radio data associated with one or more of the seed areas and/or one or more of the other areas as basis to determine at least one reference location for further radio data collected in one or more of the secondary areas.

14. The method of claim 13, wherein the at least one reference location is determined as part of a sensor fusion process that uses both (i) the geo-referenced radio data associated with one or more of the seed areas and/or one or more of the other areas deemed to be ready and (ii) location-related data from at least one other source.

15. The method of claim 1, wherein the second phase further comprises visiting one or more of the seed areas and/or one or more of the other areas in accordance with a pre-defined schedule or a pre-defined frequency of visitation.

16. The method of claim 1,
wherein, in accordance with the first phase, (i) a first one of the seeds areas is associated with a first entrance to the indoor space and (ii) a second one of the seeds areas is associated with a second entrance to the indoor space, and
wherein the first representation of the UI sets forth guidance to walk through and/or between one or more of (i) the first seed area associated with the first entrance, (ii) the second seed area associated with the second entrance, or (iii) an outdoor area outside of the indoor space.

17. A method comprising:
causing, by one or more processors, a mobile device to provide a user interface (UI) that enables an altitude data collection process for an altitude map learning system;
executing, by the one or more processors, a first phase of the altitude data collection process for a collection space, wherein the first phase comprises collection of altitude data only in one or more seed areas, the one or more seed areas being associated with generation of an initial altitude map, and wherein executing the first phase comprises providing a first representation of the UI that sets forth guidance to collect altitude data only in the one or more seed areas;
detecting, by the one or more processors, a trigger to end the first phase; and
in response to detecting the trigger, executing, by the one or more processors, a second phase of the altitude data collection process in the collection space, wherein the second phase comprises collection of altitude data in one or more secondary areas different from the one or more seed areas, the one or more secondary areas being associated with generation of an updated altitude map, and wherein executing the second phase comprises providing a second representation of the UI that sets forth guidance (i) to collect altitude data in the one or more secondary areas and (ii) to visit one or more of the seed areas and/or one or more other areas that are deemed to be ready but are different from the one or more seed areas.

18. The method of claim 17, wherein the one or more seed areas comprise at least one area in the collection space where GNSS signals are detectable to enable determining one or more of a location or an altitude estimate for the mobile device.

19. The method of claim 17, wherein causing the mobile device to provide the UI comprises causing the mobile device to display, via a display device of the mobile device, an application having visual interface features that enable the altitude data collection process via at least the first and second representations of the UI.

20. An apparatus comprising:
one or more processors;
a non-transitory computer readable medium; and
program instructions stored on the non-transitory computer readable medium and executable by the one or more processors to:
cause a mobile device to provide a user interface (UI) that enables a data collection process, the data collection process being for collection of one or more of radio data or altitude data;
execute a first phase of the data collection process for a space, wherein the first phase comprises collection of radio and/or altitude data only in one or more seed areas, the one or more seed areas being associated with generation of an initial map, and wherein executing the first phase comprises providing a first representation of the UI that sets forth guidance to collect radio and/or altitude data only in the one or more seed areas;
detect a trigger to end the first phase; and
in response to detecting the trigger, execute a second phase of the data collection process in the space, wherein the second phase comprises collection of radio and/or altitude data in one or more secondary areas different from the one or more seed areas, the one or more secondary areas being associated with generation of an updated map, and wherein executing the second phase comprises providing a second representation of the UI that sets forth guidance (i) to collect radio and/or altitude data in the one or more secondary areas and (ii) to visit one or more of the seed areas and/or one or more other areas that are deemed to be ready but are different from the one or more seed areas.

\* \* \* \* \*